(12) United States Patent
Hilmer et al.

(10) Patent No.: US 7,858,712 B2
(45) Date of Patent: Dec. 28, 2010

(54) METHOD FOR REACTING THERMOPLASTIC POLYURETHANES (I) WITH COMPOUNDS CONTAINING ISOCYANATE GROUPS

(75) Inventors: Klaus Hilmer, Brockum (DE); Oliver Steffen Henze, Schneidlingen (DE); Sabine Peters, Nortrup (DE); Hauke Malz, Diepholz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 541 days.

(21) Appl. No.: 10/580,193

(22) PCT Filed: Nov. 27, 2004

(86) PCT No.: PCT/EP2004/013474
§ 371 (c)(1),
(2), (4) Date: May 23, 2006

(87) PCT Pub. No.: WO2005/054322
PCT Pub. Date: Jun. 16, 2005

(65) Prior Publication Data
US 2007/0112143 A1    May 17, 2007

(30) Foreign Application Priority Data
Dec. 1, 2003   (DE) .................. 103 56 610

(51) Int. Cl.
*C08G 18/28* (2006.01)
(52) U.S. Cl. .................. 525/457; 525/453; 528/44; 528/67; 528/85
(58) Field of Classification Search .................. 525/457
See application file for complete search history.

(56) References Cited

U.S. PATENT DOCUMENTS

| 4,261,946 | A | | 4/1981 | Goyert et al. |
| 4,347,338 | A | | 8/1982 | Torii et al. |
| 5,106,874 | A | * | 4/1992 | Porter et al. .................. 528/64 |
| 6,142,189 | A | * | 11/2000 | Bhattacharyya ............. 138/177 |
| 6,254,712 | B1 | * | 7/2001 | Enlow et al. ........... 156/244.11 |
| 2003/0032719 | A1 | * | 2/2003 | Sapper ....................... 524/589 |
| 2004/0236035 | A1 | * | 11/2004 | Lagneaux et al. ........... 525/453 |

FOREIGN PATENT DOCUMENTS

| DE | 25 01 987 | | 7/1976 |
| DE | 41 15 508 | | 11/1992 |
| DE | 44 12 329 | | 10/1995 |
| EP | 0 417 581 | | 3/1991 |
| EP | 1 158 011 | | 11/2001 |
| GB | 2 347 933 | | 9/2000 |
| WO | 03/035711 | | 5/2003 |
| WO | PCT/FR02/03646 | * | 10/2004 |

OTHER PUBLICATIONS

Mark, Herman, et. al., eds. Encyclopedia of Polymer Science and Engineering, 2nd ed., Polyurethanes; vol. 13. p. 254. J. Wiley and Sons, New York, NY. 1985.*

* cited by examiner

*Primary Examiner*—Randy Gulakowski
*Assistant Examiner*—Kyle Baumstein
(74) *Attorney, Agent, or Firm*—Oblon, Spivak, McClelland, Maier & Neustadt, L.L.P.

(57) ABSTRACT

The invention relates to a process for reacting (i) thermoplastic polyurethanes with (ii) compounds having isocyanate groups, where the (ii) compounds used having isocyanate groups comprise (iia) compounds having at least three isocyanate groups based on aliphatic isocyanates and (iib) compounds having two isocyanate groups based on aromatic isocyanates.

10 Claims, 4 Drawing Sheets

Figure 1:
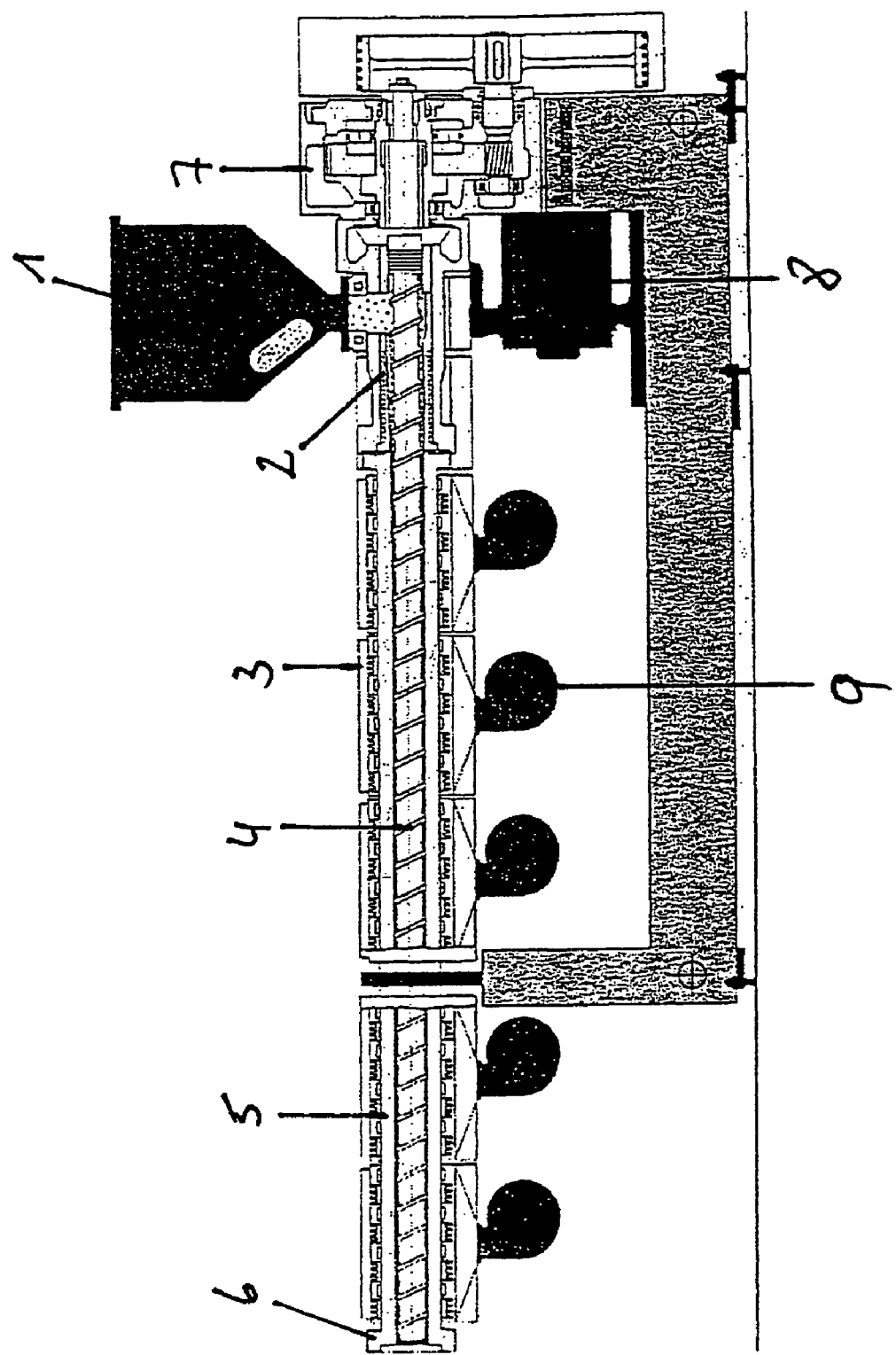

X = 6 mm for DN <= 50 mm
X = 4 mm for DN >= 60 mm

METHOD FOR REACTING THERMOPLASTIC POLYURETHANES (I) WITH COMPOUNDS CONTAINING ISOCYANATE GROUPS

The invention relates to a process for reacting (i) thermoplastic polyurethanes with (ii) compounds having isocyanate groups. The invention also relates to polyisocyanate polyaddition products, in particular fibers, hoses, cable sheathing, profiles, moldings, and foils, obtainable by way of the inventive process.

The preparation of thermoplastic polyurethanes, for which the abbreviated term TPUs is also used below, is well known.

TPUs are semicrystalline materials and belong to the class of thermoplastic elastomers. A characteristic of polyurethane elastomers is the segmented structure of the macromolecules. In the ideal case, the different cohesion energy densities of these segments result in phase separation into crystalline "hard" and amorphous "soft" regions. The resultant two-phase structure determines the property profile of TPU.

It is known from the literature that the property profile of TPU can be improved by introducing crosslinking into the TPU, the result being that strengths increase, heat resistance improves, tension set and compression set reduce, and resistance to various fluids is improved, as is resilience and creep performance.

Known crosslinking processes, inter alia, are crosslinking by UV radiation or electron beams, crosslinking via siloxane groups, and the formation of crosslinks through addition of isocyanates to the molten TPU. The reaction of a TPU, preferably in the molten state, with compounds having isocyanate groups is also termed prepolymer crosslinking, and is well known from U.S. Pat. No. 4,261,946, U.S. Pat. No. 4,347,338, DE-A 41 15 508, DE-A 4 412 329, EP-A 922 719, GB 2347933, U.S. Pat. No. 6,142,189, EP-A 1 158 011. Despite the general knowledge concerning the possibilities for prepolymer crosslinking, this process has not hitherto gained industrial acceptance. The reasons for this are, inter alia, the difficult design of apparatus. Industry has considerable difficulty in maximizing the homogeneous mixing of the TPU, usually in the form of granules, with the compounds having isocyanate groups, these liquids being of normal or high viscosity. Secondly, the reaction of the TPU with the compounds having isocyanate groups is also chemically difficult, because the mixing of the molten TPU with the prepolymer is usually carried out in an extruder, which can rapidly block if crosslinking is too rapid or too intense, in particular with relatively high-functionality isocyanates, or as a result of molar mass increase due to the curing resulting from the process. On the other hand, maximum crosslinking is desirable.

The object of the present invention consisted in optimizing the chemical components in such a way that maximum crosslinking can be achieved with very good process reliability.

In achieving this object, the (ii) compounds used having isocyanate groups comprise (iia) compounds having at least three isocyanate groups, preferably three isocyanate groups, based on aliphatic isocyanates, preferably hexamethylene diisocyanate (HDI) and/or 1-isocyanato-3,3,5-trimethyl-5-isocyanatomethylcyclohexane (isophorone diisocyanate, IPDI), particularly preferably hexamethylene diisocyanate (HDI), and (iib) compounds having two isocyanate groups based on aromatic isocyanates, preferably diphenylmethane 2,2'-, 2,4'-, and/or 4,4'-diisocyanate (MDI), particularly preferably diphenylmethane 4,4'-diisocyanate.

This particularly preferred composition, preferably a mixture of (ii) comprising (iia) and (iib), and the use of trifunctional isocyanates (iia) intrinsically introduces crosslinking points within the melt which do not then have to be formed in subsequent heat-conditioning/aging. The resultant crosslinking in the product of the process is more quantitative, preferably by way of urethane structures, which are more stable than allophanate crosslinks. The use of these trifunctional isocyanates (iia) alone is usually associated with marked disadvantages, because these compounds lead to crosslinking with simultaneous molar mass increase and therefore blockage of the extruder. This makes it difficult to achieve adequate process reliability. The particularly preferred use of the difunctional compounds (iib) and of the associated molar mass increase in the melt can permit reliable and cost-effective conduct of the process. All the more so, because (iia) is based on aliphatic isocyanates, i.e. the isocyanate groups (iia) are aliphatic isocyanate groups. These isocyanate groups are markedly less reactive than aromatic isocyanate groups, for example with respect to hydroxy groups. Since the difunctional compounds (iib), i.e. compounds having two isocyanate groups, have aromatic isocyanate groups, (iib) reacts markedly more rapidly than (iia) with the TPU, with the result that no, or only very slight, molar mass increase occurs despite the crosslinking by way of urethane bonds derived from the triisocyanate. (iib) therefore suppresses and eliminates blockage in the extruder or in the injection molding apparatus.

Surprisingly it has been found that the addition of triisocyanates and diisocyanates give excellent melt stability. Melt stability can be improved here by way of addition of very small amounts of MDI, by way of the molar mass of the TPU.

As (iia), it is preferable to use an isocyanurate having three isocyanate groups, preferably an isocyanurate based on HDI, i.e. a trimerized HDI, in which three HDIs form an isocyanurate structure, and the three free isocyanate groups are present. The (iia) used particularly preferably comprises an isocyanurate whose NCO content is from 20% to 25%, preferably from 21.5% to 22.5%, and whose viscosity at 23° C. is from 2500 mPas to 4000 mPas.

As (iib), it is preferable to use diphenylmethane 2,2'-, 2,4'- and/or 4,4'-diisocyanate (MDI), a carbodiimide-modified MDI, and/or a prepolymer based on MDI. The (iib) used particularly preferably comprises a prepolymer based on diphenylmethane 2,2'-, 2,4'- and/or 4,4'-diisocyanate (MDI), alkanediol, preferably dipropylene glycol, with a molar mass of from 60 g/mol to 400 g/mol, and polyetherdiol, preferably polypropylene glycol ether, with a molar mass of from 500 g/mol to 4000 g/mol. Particular preference is given to a prepolymer as (iib) with a viscosity at 25° C. of from 500 mPas to 800 mPas, preferably from 550 mPas to 770 mPas, and having an NCO content of from 20% to 25%, preferably from 22.4% to 23.4%.

The ratio by weight (iia):(iib) at which (iia) and (iib) are used is from 1:1 to 1:10 preferably from 1:3 to 1:4.

In a particularly preferred method for carrying out the process, from 1 to 10 parts by weight, particularly from 2 to 6 parts by weight, of (ii) compounds having isocyanate groups are used per 100 parts by weight of (i) thermoplastic polyurethane.

The result of the excess of isocyanate groups via the addition of (ii) is that, during and/or after the mixing of the cold or warm components (i) and (ii), these isocyanate groups form crosslinks in the form of, for example, urethane structures, allophanate structures, uretdione structures, and/or isocyanurate structures, and sometimes also urea bonds and biuret bonds, which improve the properties of the polyisocyanate polyaddition products. The formation of the crosslinks may, if appropriate, be promoted by adding catalysts which are well known for this purpose, for example alkali metal acetates and/or alkali metal formates. Crosslinking also takes place by way of free groups reactive toward isocyanates, e.g. hydroxy groups or primary or secondary amino groups, in particular hydroxy groups, in the linear TPU polymer. These reactive groups may be intrinsically present in the TPU granules, but they are also produced in the TPU melt in the extruder, e.g. via thermodynamic cleavage of the polymer chain under processing conditions, or else during aging or heat-conditioning of the isocyanate-rich material.

Another object underlying the present invention was to develop a process which reacts (i) thermoplastic polyurethanes with (ii) compounds having isocyanate groups, in particular comprising tri- and polyisocyanates, and whose apparatus is designed to permit safe, rapid, and reliable reaction. This process should avoid variations in product properties, and also throughput variations with resultant dimensional variations during extrusion, deposits in the extruder or in the injection molding machine, and premature crosslinking via triisocyanates associated with stoppage of transport (blocking of the plant).

This object was achieved by feeding (i) preferably granulated thermoplastic polyurethane by way of a feeding aid, i.e. a feed zone with conveying action, to an extruder or an injection molding apparatus, preferably an extruder, and, in the extruder or in the injection molding apparatus, preferably in the extruder, mixing it with (ii) compounds having isocyanate groups, and preferably reacting it before it leaves the extruder.

By way of the preferred use of a feeding aid, by way of which (i) and preferably also (ii) are fed to the extruder, it is possible, at the extruder or at the injection molding apparatus, to introduce solid TPU granules together or separately, preferably together with the (ii) compounds having isocyanate groups, these compounds preferably being liquids or normal or high viscosity at 15° C., preferably of normal viscosity, into the extruder or the injection molding apparatus rapidly and reliably. Since the melt pressure usually rises along the length of the extruder, it is preferable for the (ii) compounds having isocyanate groups to be introduced into the extruder at a point at which the melt pressure is less than 200 bar. It is particularly preferable for the (ii) compounds having isocyanate groups to be introduced by way of the feeding aid into the extruder or the injection molding apparatus together with (i) thermoplastic polyurethanes, and this means using the same feeding aid for (i) and (ii).

The extruder may be a well-known extruder, for example one well-known for TPU extrusion, for example a single- or preferably twin-screw extruder, particularly preferably a single-screw extruder with a feeling aid, in particular a grooved feeding aid. However, the particularly preferred embodiments according to the present invention give particularly effective and economic mixing and reaction of (i) and (ii).

Feeding aids for extruders are well known to the person skilled in the art in the extrusion sector and have been widely described. The feeding aid is preferably a grooved feed zone. Grooved feeding aids, termed a grooved-barrel extruder or extruder with grooved feed zone, are well known to the person skilled in the art in the extruder technology sector and have been widely described, e.g. in "Der Extruder im Extrusionsprozess—Grundlage für Qualität und Wirtschaftlichkeit" [The extruder in the extrusion process—basis for quality and cost-effectiveness], VDI-Verlag GmbH, Düsseldorf, 1989, ISBN 3-18-234141-3, pp. 13-27. A characteristic of a grooved feed zone is the presence of longitudinal grooves in the barrel wall, usually substantially parallel to the longitudinal direction of the screw in the feed zone of the extruder, and these usually proceed in the manner of a cone toward the end of the feed zone, seen in the direction of transport. According to the invention, these grooves give markedly better axial transport of (i) and (ii) by way of the screw in the extruder, despite the feeding of a liquid component (ii) into the extruder. This marked effect was unexpected, because the person skilled in the art would have expected that the liquid component (ii) of normal or high viscosity would reduce or eliminate the effectiveness of the grooves.

The depth of the grooves is preferably from 10% to 90% of the average particle diameter of (i), and this means that the depth of the grooves is markedly less than the average particle diameter of the granulated TPU (i). The depth of the grooves is particularly preferably from 1 mm to 8 mm, with preference from 2 mm to 5 mm. The length of the grooved feed zone is particularly preferably from twice to four times the screw diameter. The number of grooves in the grooved feed zone is preferably from 4 to 32, particularly preferably from 4 to 16, preferably proceeding in a parallel or helical fashion, preferably parallel to the longitudinal axis of the extruder.

The screws used may be well-known screws, e.g. 3- or 5-zone screws. Particular advantages are obtained in the present process by using an extruder which has a barrier screw. Barrier screws are well-known in extrusion, e.g. from "Der Extruder im Extrusionsprozess—Grundlage für Qualität und Wirtschaftlichkeit" [The extruder in the extrusion process—basis for quality and cost-effectiveness], VDI-Verlag GmbH, Düsseldorf, 1989, ISBN 3-18-234141-3, pp. 107-125 and 139-143. An unexpected outcome, surprising for the person skilled in the art, was that it is specifically barrier screws which give particular advantages in the preferred solid/liquid metering process, in particular in the mixing and reaction of (i) and (ii), these advantages being that the liquid components pass rapidly over the barrier flight into the melt-filled cavity of the screw, thus being protected from thermal degradation and prevented from affecting the melting of the granules. The reaction of (i) and (ii) then takes place preferably starting from very high isocyanate content, slowly falling away, because melt flows continuously over the barrier. The result is particularly good controllability of the process.

An example of an extruder is shown in FIG. 1, where the abbreviations have the following meanings:

1: feed hopper
2: grooved feed zone
3: electrical heating
4: screw
5: barrel
6: attachment flange
7: gear box
8: drive motor
9: cooling fan.

Figure 2:
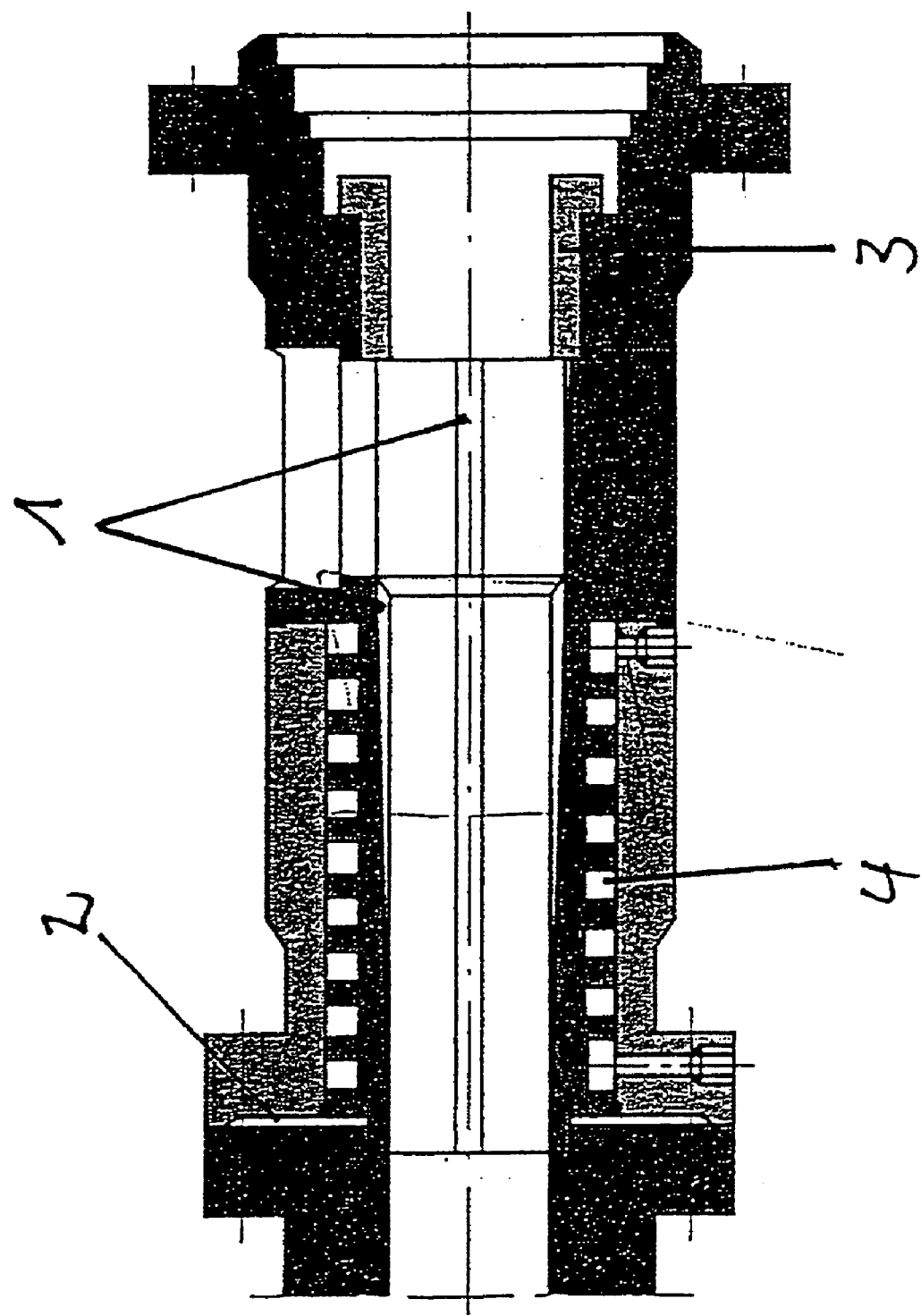

FIG. 2 shows an example of a grooved feed zone where the abbreviations have the following meanings:

1: longitudinal groove
2: thermal isolation
3: sleeve
4: cooling system

Figure 3:
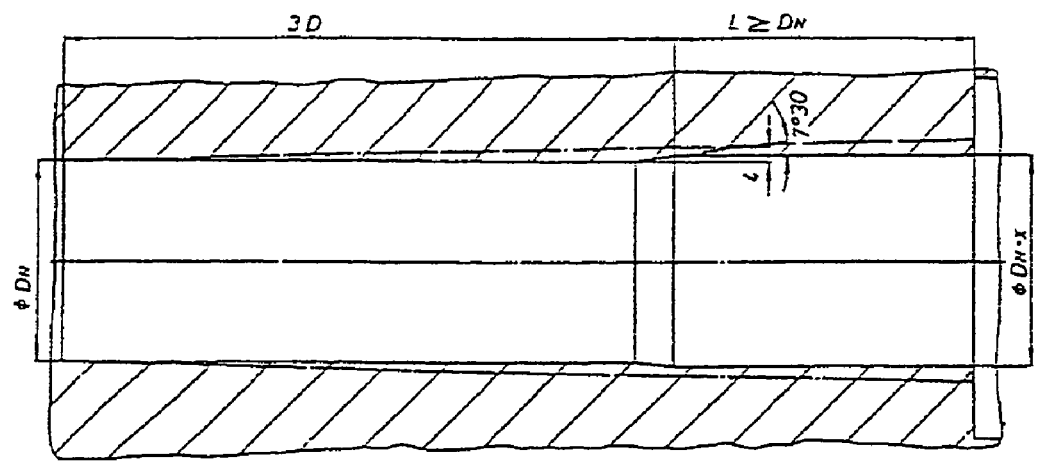
Figure 4:
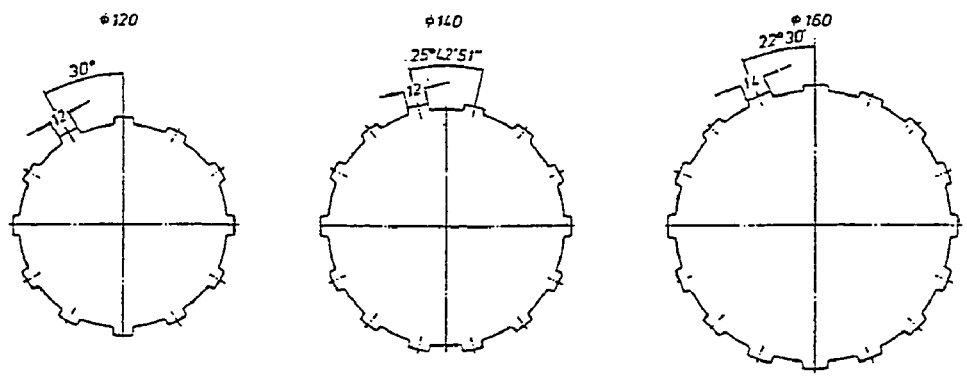
Figure 4:
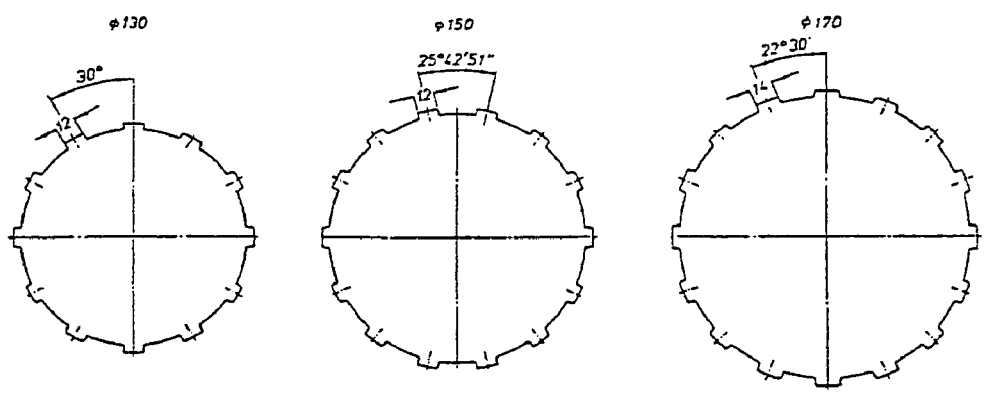
Figure 4:
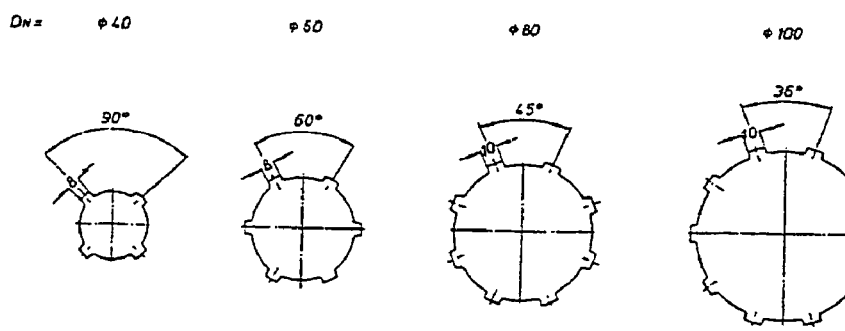
Figure 4:
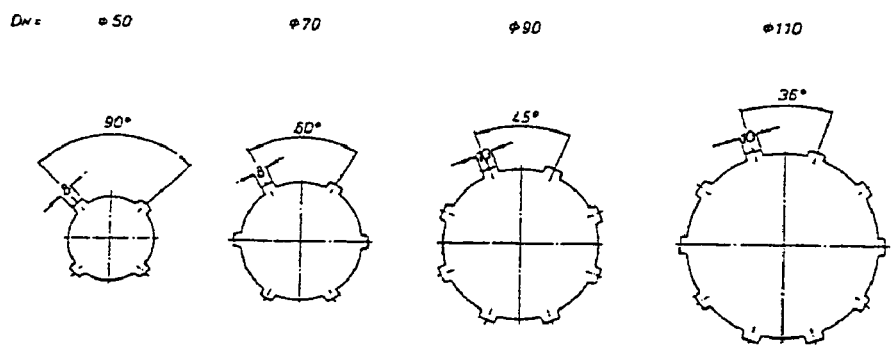

FIG. 3 shows an example of a grooved feed zone in longitudinal section, i.e. parallel to the screw, whereas FIG. 4 shows various examples of grooved feed zones in cross section, the meanings here being:

DN: nominal diameter
X: diameter increase.

The temperature of the melt in the extruder or in the injection molding apparatus, preferably the extruder, is usually from 150° C. to 240° C., preferably from 180° C. to 230° C.

The residence time of the TPU in the extruder is preferably from 120 s to 600 s.

The inventive product of the process can be processed by well-known processes to give moldings of any type, foils, hoses, sheathing for cables, injection-molded items, or fibers. The processing temperature in the production of the foils, moldings, or fibers is preferably up to 150-230° C., particularly preferably 180-220° C. Processing of the mixture to give the desired foils, moldings, and/or fibers preferably takes place directly after or during the mixing of the components (i) and (ii), because thermoplastic processing of the polyisocyanate polyaddition product to give foils, moldings, or fibers is preferably carried out prior to and/or during the formation of the crosslinks.

By way of subsequent heat-conditioning/storage of the products from the extrusion, injection molding, or melt spinning process, for example the moldings, foils, or fibers, at a temperature of, for example, from 120 to 80° C. for a period which is usually at least 2 hours, preferably from 12 to 48 hours, allophanate crosslinking, uretdione crosslinking, and/or isocyanurate crosslinking, and sometimes, by way of hydrolysis, also urea bonds and biurets, maybe formed by way of the isocyanate groups present in excess in the polyisocyanate polyaddition products. This crosslinking gives the products very advantageous properties in relation to heat resistance and post-loading hysteresis behavior.

The TPUs used may comprise well-known TPUs. The TPUs may be used in the inventive process in conventional form, e.g. in the form of granules or pellets. TPUs are well known and have been widely described.

Processes for preparing TPUs are well known. For example, the thermoplastic polyurethanes may be prepared by reacting (a) isocyanates with (b) compounds reactive toward isocyanates and having a molar mass of from 500 to 10 000, and, if appropriate, with (c) chain extenders having a molar mass of from 50 to 499, if appropriate in the presence of (d) catalysts, and/or of (e) conventional auxiliaries and/or additives. The starting components and processes for preparing the preferred TPUs will be illustrated below by way of example. Examples of the components (a), (b), and also, if appropriate, (c), (e), and/or (f) usually used in preparing the TPUs will be described below:

a) Organic isocyanates (a) which may be used are well-known aliphatic, cycloaliphatic, araliphatic, and/or aromatic isocyanates, preferably diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'-, and 2,2'-diisocyanate, diphenylmethane 2,2'-, 2,4'-, and/or 4,4'-diisocyanate (MDI), 1,5-naphthylene diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate.

b) Compounds (b) which are reactive toward isocyanates and which may be used are the well-known compounds reactive toward isocyanates, for example polyesterols, polyetherols, and/or polycarbonatediols, these usually being brought together under the term "polyols", with molar masses of from 500 to 8000, preferably from 600 to 6000, in particular from 800 to 4000, and preferably with an average functionality of from 1.8 to 2.3, preferably from 1.9 to 2.2, in particular 2. It is preferable to use polyether polyols, particularly preferably those polyetherols based on polyoxytetramethylene glycol. The polyetherols have the advantage that they are superior to polyesterols in resistance to hydrolysis.

c) Chain extenders (c) which may be used are well-known aliphatic, araliphatic, aromatic and/or cycloaliphatic compounds with a molar mass of from 50 to 499, preferably bifunctional compounds, for example diamines and/or alkanediols having from 2 to 10 carbon atoms in the alkylene radical, in particular 1,4-butanediol, 1,6-hexanediol, and/or di-, tri-, tetra-, penta-, hexa-, hepta-, octa-, nona-, and/or decaalkylene glycols having from 3 to 8 carbon atoms, and preferably corresponding oligo- and/or polypropylene glycols. Mixtures of the chain extenders may also be used here.

d) Suitable catalysts which in particular accelerate the reaction between the NCO groups of the diisocyanates (a) and the hydroxy groups of the structural components (b) and (c) are the known and conventional tertiary amines of the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane, and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

e) Besides catalysts (d), conventional auxiliaries (e) may also be added to the structural components (a) to (c). By way of example, mention may be made of surface-active substances, fillers, flame retardants, nucleating agents, antioxidants, lubricants, and mold-release agents, dyes, and pigments, and, if appropriate, stabilizers, e.g. with respect to hydrolysis, light, heat, or discoloration, inorganic and/or organic fillers, reinforcing agents, and plasticizers. Hydrolysis stabilizers used are preferably oligomeric and/or polymeric aliphatic or aromatic carbodiimides.

Further details concerning the abovementioned auxiliaries and additives can be found in the technical literature, for example in Plastics Additive Handbook, 5$^{th}$ edition, H. Zweifel, ed., Hanser Publishers, Munich, 2001. All of the molar masses mentioned in this specification have the unit [g/mol]. To adjust hardness of the TPUs, the molar ratios of the structural components (b) and (c) may be varied relatively widely. Molar ratios which have proven successful between component (b) and the entire amount of chain extenders (c) to be used are from 10:1 to 1:10, in particular from 1:1 to 1:4, the hardness of the TPUs rising as content of (c) increases. The reaction may take place at conventional indices, preferably at an index of from 60 to 120, particularly preferably at an index of from 80 to 110. The index is defined via the ratio of the total number of isocyanate groups used during the reaction in component (a) to the groups reactive toward isocyanates, i.e. the active hydrogen atoms, in components (b) and (c). If the index is 100, there is one active hydrogen atom, i.e. one function reactive toward isocyanates, in components (b) and (c) for each isocyanate group in component (a). If the index is above 100, there are more isocyanate groups present than OH groups. The TPUs may be prepared by the known processes continuously, for example using reactive extruders or the belt process by the one-shot method or prepolymer method, or batchwise by the known prepolymer process. In these processes, the components to be reacted: (a), (b), and, if appropriate, (c), (d), and/or (e) are mixed with one another in succession or simultaneously, whereupon the reaction begins immediately. In the extruder process, structural components (a), (b), and also, if appropriate, (c), (d), and/or (e) are introduced, individually or as a mixture, into the extruder, and reacted, e.g. at temperatures of from 100 to 280° C., preferably from 140 to 250° C., and the resultant TPU is extruded, cooled, and granulated, or cooled during the granulating process.

The following compounds comprising isocyanate groups were used (a) Lapranat® MP 102 (modified diphenylmethane diisocyanate (MDI), BASF Akiengesellschaft) and Basonat® HI 100 (triisocyanate based on isocyanuratized hexamethylene diisocyanate (HDI), BASF Aktiengesellschaft) in a ratio of 4:1 by weight (b) Lupranat® MP 102 (BASF Aktiengesellschaft) and Basonat® HI 100 (BASF Akiengesellschaft) in a ratio of 2:1 by weight (c) Lupranat® MP 102 (BASF Aktiengesellschaft). The mixtures obtained and the pure isocyanate could be conveyed by a gear pump at room temperature.

EXAMPLE 1

Various amounts of the mixture (b) were fed in an extruder with grooved feed zone, I/D 25-32, and with a barrier mixing section screw whose feed region was adapted approximately for grooves, into an Elastollan® E 1180A (TPU from Elastogran GmbH). This gave homogeneous extrudates with a smooth surface.

EXAMPLE 2

The specimens from Example 1 (2-4 g) were stirred for 14 hours in DMF (50 ml). The soluble fractions were then determined for the specimens.

TABLE 1

Soluble fractions of the materials obtained in Example 1.

| Addition of isocyanate in percent by weight, based on extruder output | Heat-conditioning | Addition to DMF | Soluble fractions (%) |
|---|---|---|---|
| 0 | 20 h at 100° C. | Dibutylamine 1% | 100 |
| 0 | 20 h at 100° C. | | 100 |
| 0 | | Dibutylamine 1% | 100 |
| 0 | | | 100 |
| 2.5 | 20 h at 100° C. | Dibutylamine 1% | 18 |
| 2.5 | 20 h at 100° C. | | 2 |
| 2.5 | | Dibutylamine 1% | 60 |
| 2.5 | | | 7 |
| 5 | 20 h at 100° C. | Dibutylamine 1% | 8 |
| 5 | 20 h at 100° C. | | 1 |
| 5 | | Dibutylamine 1% | 16 |
| 5 | | | 2 |

Aromatic allophanate bonds are broken by DMF comprising dibutylamine. The very low solubility of the crosslinked TPUs in DMF comprising 1% of dibutylamine shows that the crosslinking here took place by way of a relatively stable type of crosslinking, e.g. urethane bonds. Addition of 5% of isocyanate (b) gave higher degrees of crosslinking than addition of 2.5%.

EXAMPLE 3

The mixtures (a) and (b), and also (c) were fed in an extruder with grooved feed zone, I/D 25-32, and with a barrier mixing section screw whose feed region was adapted appropriately for grooves, into an Elastollan® E 1180A. This gave homogeneous extrudates with a smooth surface.

EXAMPLE 4

The specimens from Example 3 (2-4 g) were stirred for 14 hours in DMF (50 ml). The soluble fractions were then determined for the specimens.

TABLE 2

Soluble fractions of the materials obtained in Example 3.

| Isocyanate added | Addition of isocyanate in percent by weight, based on extruder output | Heat-conditioning | Addition to DMF | Soluble fractions (%) |
|---|---|---|---|---|
| — | 0 | 20 h at 100° C. | Dibutylamine 1% | 100 |
| (b) | 2.5 | 20 h at 100° C. | Dibutylamine 1% | 8 |
| (a) | 2.5 | 20 h at 100° C. | Dibutylamine 1% | 54 |
| (b) | 4 | 20 h at 100° C. | Dibutylamine 1% | 1 |
| (a) | 4 | 20 h at 100° C. | Dibutylamine 1% | 33 |
| (c) | 4 | 20 h at 100° C. | Dibutylamine 1% | 100 |
| — | 0 | 20 h at 100° C. | | 100 |
| (b) | 2.5 | 20 h at 100° C. | | 2 |
| (a) | 2.5 | 20 h at 100° C. | | 2 |
| (b) | 4 | 20 h at 100° C. | | 2 |

TABLE 2-continued

Soluble fractions of the materials obtained in Example 3.

| Isocyanate added | Addition of isocyanate in percent by weight, based on extruder output | Heat-conditioning | Addition to DMF | Soluble fractions (%) |
|---|---|---|---|---|
| (a) | 4 | 20 h at 100° C. | | 2 |
| (c) | 4 | 20 h at 100° C. | | 40 |
| — | 0 | | Dibutylamine 1% | 100 |
| (b) | 2.5 | | Dibutylamine 1% | 88 |
| (a) | 2.5 | | Dibutylamine 1% | 100 |
| (b) | 4 | | Dibutylamine 1% | 15 |
| (a) | 4 | | Dibutylamine 1% | 82 |
| (c) | 4 | | Dibutylamine 1% | 100 |
| — | 0 | | | 100 |
| (b) | 2.5 | | | 15 |
| (a) | 2.5 | | | 7 |
| (b) | 4 | | | 3 |
| (a) | 4 | | | 3 |
| (c) | 4 | | | 45 |

Crosslinking with the isocyanate (c) proceeded by way of allophanates soluble in DMF with dibutylamine. It is known that these allophanates can be cleaved reversibly at temperatures above 150-160° C. The crosslinking points obtained via use of the isocyanate mixtures (a) and (b) were not attacked, or were attacked to a lesser extent, by dibutylamine, and were therefore more stable than those with the isocyanate (c). Crosslinking with a mixture composed of di- and trifunctional isocyanate therefore represented a qualitatively higher grade of crosslinking. With the isocyanate mixture (b), the most stable crosslinking was achieved, because this mixture comprised the highest proportion of trifunctional isocyanate.

EXAMPLE 5

The mixture (b) was fed in an extruder with grooved feed zone, I/D 25-32, and with a barrier mixing section screw whose feed region was adapted appropriately for grooves, into Elastollan® E 1154D. This gave homogeneous extrudates with a smooth surface.

EXAMPLE 6

The specimens from Example 5 (2-4 g) were stirred for 14 hours in DMF (50 ml). The soluble fractions were then determined for the specimens.

TABLE 3

Soluble fractions of the materials obtained in Example 5.

| Isocyanate added, based on extruder output | Addition of isocyanate in percent by weight | Heat-conditioning | Addition to DMF | Soluble fractions (%) |
|---|---|---|---|---|
| — | 0 | 20 h at 100° C. | Dibutylamine 1% | 100 |
| (b) | 5 | 20 h at 100° C. | Dibutylamine 1% | 23 |
| — | 0 | 20 h at 100° C. | | 100 |
| (b) | 5 | 20 h at 100° C. | | 2 |

TPU materials with high Shore hardness can be crosslinked by the method used.

EXAMPLE 7

The mixture (b) was fed in an extruder with grooved feed zone, I/D 25-32, and with a barrier mixing section screw whose feed region was appropriately adapted for grooves, into Elastollan® E 1180A. Materials 1 and 2 were obtained, with the properties shown in Table 4. The crosslinked material exhibited improved tensile set.

TABLE 4

Mechanical properties of crosslinked materials (5% of isocyanate feed) in comparison with standard material (0% of isocyanate feed).

| | Addition of isocyanate (b) in percent by weight, based on extruder output | Shore A hardness | Tensile strength (MPa) | Tensile strain at break (%) | Tensile set (%) |
|---|---|---|---|---|---|
| Material 1 | 0 | 80 | 44.9 | 549 | 35 |
| Material 2 | 5 | 82 | 33.3 | 353 | 12 |

EXAMPLE 8

The specimens of Example 7 were subjected to a hot set test (based on DIN EN 60811-2-1). The specimens were loaded at cross section 20 mm$^2$, with a weight of 400 g, at 180° C.

TABLE 5

Hot set test based on DIN EN 60811-2-1.

| | 1st measurement % | 2nd measurement % |
|---|---|---|
| Material 1 | break-off | break-off |
| Material 2 | 80 | 40 |

EXAMPLE 9

The softening point of the materials obtained in Example 8 was determined by thermal mechanical analysis (TMA) to DIN ISO 11359 (test conditions: heating rate 20 K/min, specimen geometry: thickness 2 mm, diameter 8 mm, load applied: 0.5N using 6 mm quartz plates). Storage for 30 minutes at 210° C. of a molding composed of material 2 resulted in very slight deformation, whereas material 2 had melted completely at this temperature.

TABLE 6

Softening point determined by TMA.

|  | Softening point (° C.) |
|---|---|
| Material 1 | 160 |
| Material 2 | 220 |

EXAMPLE 10

The mixture (a) was fed in an extruder with grooved feed zone, I/D 25-32, and with a barrier mixing section screw whose feed region was appropriately adapted for grooves, into an Elastollan® E 1195A. The crosslinked TPU exhibited a relatively high level of stress/strain performance to DIN 53504.

TABLE 7

Stress/strain values at room temperature

| Addition of isocyanate (a) in percent by weight based on extruder output | Sigma 5 in MPa | Sigma 20 in MPa | Sigma 100 in MPa | Sigma 200 in MPa | Sigma 300 in MPa |
|---|---|---|---|---|---|
| 0 | 2.2 | 5.5 | 9.9 | 13.4 | 20.0 |
| 5 | 2.4 | 5.8 | 11.8 | 18.7 | 32.9 |

EXAMPLE 11

The mixture (b) was fed in an extruder with grooved feed zone, I/D 25-32, and with a barrier mixing section screw whose feed region was adapted appropriately for grooves, into an Elastollan® E 1195A. The volume resistivity of the resulting materials was determined to DIN IEC 60093. The crosslinked TPU exhibited an increased volume resistivity.

TABLE 8

Resistivity of crosslinked TPUs.

| Addition of isocyanate (b) in percent by weight, based on extruder output | Ohm * cm | Comment |
|---|---|---|
| 4 | 4.8E+11 | 2 h salt-mains water (1%) at 70° C. |
| 6 | 6.2E+11 | 2 h salt-mains water (1%) at 70° C. |
| 0 | 9.5E+10 | 2 h salt-mains water (1%) at 70° C. |

EXAMPLE 12

The mixture (b) was fed in an extruder with grooved feed zone, I/D 25-32, and with a barrier mixing section screw whose feed region was adapted appropriately for grooves, into an Elastollan® EC 78A. The material was stored in xylene, and then the weight was determined after swelling in percent in relation to initial weight. Relatively little swelling was observed for the crosslinked materials.

TABLE 9

Swelling performance of crosslinked Elastollan ® EC 78A.

| | Percent by weight of isocyanate (b) feed | | |
|---|---|---|---|
| Swelling time in h | 0 | 4 | 8 |
| 0.5 | 147.31 | 123.58 | 122.62 |
| 1 | 166.75 | 133.57 | 129.58 |
| 2 | 176.38 | 142.88 | 136.59 |
| 3 | 179.72 | 143.79 | 139.62 |
| 4 | 181.08 | 145.11 | 139.35 |
| 5 | 180.21 | 144.39 | 140.39 |
| 8 | 180.79 | 145.07 | 140.74 |

EXAMPLE 13

The mixture (b) was fed in an extruder with grooved feed zone, I/D 25-32, and with a barrier mixing section screw whose feed region was adapted appropriately for grooves, into an Elastollan® E 1195A. The material was stored in xylene, and then the weight was determined after swelling in percent in relation to initial weight. Relatively little swelling was observed for the crosslinked materials.

TABLE 10

Swelling performance of crosslinked Elastollan ® E 1195A.

| | Percent by weight of isocyanate feed | | |
|---|---|---|---|
| Swelling time in h | 0 | 4 | 8 |
| 0.5 | 126.44 | 115.48 | 113.72 |
| 1 | 142.34 | 124.25 | 120.18 |
| 2 | 150.43 | 133.87 | 128.08 |
| 3 | 151.84 | 136.45 | 131.08 |
| 4 | 151.40 | 138.50 | 132.53 |
| 5 | 151.91 | 138.72 | 133.02 |

EXAMPLE 14

The mixture (a) was fed in an extruder with grooved feed zone, I/D 25-32, and with a barrier mixing section screw whose feed region was adapted appropriately for grooves, into an Elastollan® EC 78A. The following mechanical properties were measured.

| Addition of isocyanate (b) in percent by weight | Modulus of elasticity | Shore A | Tensile strength in MPa | Tensile strain at break in % | Tensile set in % |
|---|---|---|---|---|---|
| 0 | 17 | 78 | 54 | 570 | 8 |
| 6 | 18 | 80 | 54 | 390 | 2 |

The crosslinked TPU exhibited a relatively small tensile set.

EXAMPLE 15

The mixture (b) was fed in an extruder with grooved feed zone, I/D 25-32, and with a barrier mixing section screw whose feed region was adapted appropriately for grooves, into an Elastollan® E 1195A.

In comparison with a standard Elastollan® E 1195A material, the creep resistance found, determined to DIN EN ISO 899 was relatively high for the crosslinked material.

We claim:

1. A process comprising reacting (i) thermoplastic polyurethanes with (ii) compounds having isocyanate groups, wherein the (ii) compounds having isocyanate groups comprise (iia) compounds having at least three isocyanate groups based on aliphatic isocyanates and (iib) compounds having two isocyanate groups based on aromatic isocyanates
wherein the ratio by weight (iia):(iib) at which (iia) and (iib) are used is from 1:3 to 1:10 and
from 1 to 10 parts by weight of (ii) compounds having isocyanate groups are used per 100 parts by weight of (i) thermoplastic polyurethane.

2. The process according to claim 1, wherein the (iia) compound is an isocyanurate having three isocyanate groups.

3. The process according to claim 1, wherein the (iia) compound is an isocyanurate with an NCO content of from 20% to 25% and with a viscosity at 23° C. of from 2500 mPas to 4000 mPas.

4. The process according to claim 1, wherein the (iib) compounds are, a carbodiimide-modified diphenylmethane 2,2'-, 2,4'- and/or 4,4'-diisocyanate (MDI), and/or a prepolymer based on diphenylmethane 2,2'-, 2,4'- and/or 4,4'-diisocyanate (MDI).

5. The process according to claim 1, wherein the (iib) compounds are a prepolymer based on diphenylmethane 2,2'-, 2,4'- and/or 4,4'-diisocyanate (MDI), alkanediol with a molar mass of from 60 g/mol to 400 g/mol, and polyetherdiol with a molar mass of from 500 g/mol to 4000 g/mol.

6. The process according to claim 5, wherein the prepolymer has a viscosity at 25° C. of from 500 mPas to 800 mPas and an NCO content of from 20% to 25%.

7. The process according to claim 1, wherein granulated (i) thermoplastic polyurethane is melted in an extruder and in the molten state is mixed and reacted with (ii) compounds having isocyanate groups.

8. The process according to claim 7, wherein (i) granulated thermoplastic polyurethane is introduced into the extruder together with (ii) compounds having isocyanate groups by way of a feeding aid.

9. The process according to claim 7, wherein the extruder has a barrier screw.

10. A polyisocyanate polyaddition product prepared by the process according to claim 1.

* * * * *